(12) United States Patent
Kamoi (10) Patent No.: US 9,092,703 B2
(45) Date of Patent: Jul. 28, 2015

(54) DETERMINING ROUTE AND OF PRINT DATA AND IF CONVERSION OF PRINT DATA IS NECESSARY

(71) Applicant: CANON KABUSHIKI KAISHA, Tokyo (JP)

(72) Inventor: Keiko Kamoi, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 125 days.

(21) Appl. No.: 13/673,801

(22) Filed: Nov. 9, 2012

(65) Prior Publication Data

US 2013/0120794 A1 May 16, 2013

(30) Foreign Application Priority Data

Nov. 16, 2011 (JP) ................. 2011-250878

(51) Int. Cl.
*G06F 3/12* (2006.01)
*G06K 15/02* (2006.01)
*G06K 15/00* (2006.01)

(52) U.S. Cl.
CPC ............... *G06K 15/02* (2013.01); *G06F 3/122* (2013.01); *G06F 3/1236* (2013.01); *G06F 3/1247* (2013.01); *G06F 3/1287* (2013.01); *G06F 3/1288* (2013.01); *G06K 15/1821* (2013.01); *G06K 15/1822* (2013.01); *G06K 15/4045* (2013.01); *G06F 3/121* (2013.01); *G06F 3/1208* (2013.01); *G06F 3/1234* (2013.01)

(58) Field of Classification Search
CPC ................................................... G06K 15/107
USPC ........................................................ 358/1.15
See application file for complete search history.

(56) References Cited

U.S. PATENT DOCUMENTS

2005/0206917 A1* 9/2005 Ferlitsch ........................ 358/1.5
2006/0093380 A1* 5/2006 Sugiura et al. .................... 399/8

FOREIGN PATENT DOCUMENTS

JP 2003-85058 A 3/2003

* cited by examiner

*Primary Examiner* — Eric A Rust
(74) *Attorney, Agent, or Firm* — Canon USA, Inc., IP Division (57) ABSTRACT

An image forming apparatus includes a storage unit, a selection unit, and a generation unit. The storage unit stores first route information for acquiring first print information from an information processing apparatus, and stores second route information for acquiring second print information via an information conversion apparatus. The selection unit selects the second route information if conversion of the first print information into the second print information is necessary. In response to determining that a factor disturbing an acquisition of the second print information exist, the generation unit changes the second route information selected by the selection unit to the first route information, and request the conversion to the information processing apparatus so that, among pieces of print information which can be output from the information processing apparatus and can be printed by the image forming apparatus, the first print information becomes print information closer to the second print information.

9 Claims, 11 Drawing Sheets

| JOB ID | PIN CODE | PAPER SIZE | IMAGE QUALITY SETTING | LAYOUT | COPY-FORGERY-INHIBITED PATTERN PRINTING |
|---|---|---|---|---|---|
| 1 | — | A4 | NORMAL QUALITY | 1up | ON |
| 2 | — | A4 | HIGH QUALITY | 2up | OFF |
| 3 | — | A5 | NORMAL QUALITY | 1up | OFF |
| 4 | xxx | LETTER | NORMAL QUALITY | 4up | OFF |
| 5 | *** | A3 | HIGH QUALITY | index | OFF |

FIG.9A

|  | IMAGE QUALITY SETTING | LAYOUT | COPY-FORGERY-INHIBITED PATTERN PRINTING | SORTING OUTPUT |
|---|---|---|---|---|
| DIRECT FROM PRINT SERVER | NORMAL QUALITY | 1up/2up/4up | OFF | NO |
| VIA PRINT DATA CONVERSION SERVER | HIGH QUALITY | index | ON | YES |

FIG.9B

| PROXY ACQUISITION POSSIBLE | NORMAL QUALITY | HIGH QUALITY | LAYOUT (1up/2up/4up) |
|---|---|---|---|
| PROXY ACQUISITION IMPOSSIBLE | LAYOUT (index) | COPY-FORGERY-INHIBITED PATTERN PRINTING ON | SORTING OUTPUT YES |

DETERMINING ROUTE AND OF PRINT DATA AND IF CONVERSION OF PRINT DATA IS NECESSARY

BACKGROUND OF THE INVENTION

1. Field of the Invention

The present invention relates to an image forming apparatus, a print control method, and a storage medium.

2. Description of the Related Art

Recently, the number of office machines such as copying machines and printers, which can perform "cloud print", has been increasing. The "cloud print" is a technique which allows a user to access to a cloud service via a terminal and to print a file remotely. In the "cloud print", files can be transmitted to any printers directly from desktop type personal computers (PCs) and mobile applications without printer drivers.

Further, with the spread of smart phones and tablet type terminals, chances of browsing e-mails and web pages, and creating documents using the mobile terminals have increased. Thus, the driverless cloud service for the cloud print has been becoming a mainstream for future web services.

In addition, in the market of low cost and compact image forming apparatuses, supports for the cloud print is required, and methods for realizing the cloud print have been proposed. For example, in low price image forming apparatuses, which cannot support the print of Portable Document Format (PDF), if the output format of a print server is PDF only, the image forming apparatuses cannot acquire print data directly to print thereof.

To solve such a problem of the system configuration, a method is proposed which acquires data after converting the data via a conversion server into a format that can be printed by an image forming apparatus (e.g., Page Description Language (PDL)).

Further, even if rendering of the format that can be output by the print server is possible, performance may be deteriorated depending on the performance of the image forming apparatuses. To solve such a problem, a method has been studied, in which a most suitable format of data to be acquired is selected according to the print setting information (e.g., image quality setting value) and the operating status of the image forming apparatus, and a route for acquiring the data (data acquisition route) is dynamically switched according to the selected format.

As described above, low cost and compact image forming apparatuses employ a system configuration appropriate for the ability of the image forming apparatuses. As a result, high quality services can be provided.

However, in a case where a system configuration has a plurality of data acquisition routes, if a communication trouble occurs in a data acquisition route, data cannot be acquired through the data acquisition route, which is problematic.

As a switching technique of the data acquisition destinations in such a case, another server is selected dynamically as a new data acquisition destination server when a trouble occurs at an original data acquisition destination server, as discussed, for example, in Japanese Patent Application Laid-open No. 2003-85058.

The main server for a data acquisition destination stores an address information list (e.g., IP addresses, media access control (MAC) addresses, model type numbers) of a plurality of servers that can be proxies of the data acquisition destination and has transmitted the address information list to a sub server in advance. When the sub server detects a communication trouble occurred between the main server for a data acquisition destination and the image forming apparatus, the sub server refers to the transmitted address information list to search for a proxy server for a data acquisition destination. When a proxy server for the data acquisition destination is found, the sub server is set as a main server. In this way, dynamic switching to a new server for the data acquisition destination can be realized.

According to the technique discussed in Japanese Patent Application Laid-open No. 2003-85058, each server is located in a same network (N/W), has a same configuration, and can be the main server or the sub server for the data acquisition destination. For this reason, each server includes a detection unit for detecting an occurrence of a communication trouble of the server for the data acquisition destination and a generation unit (an interface for notifying IP addresses or MAC addresses) for generating an address information list used for searching for a server.

However, it is not practical for the cloud print to set a plurality of servers to have a same configuration as discussed in Japanese Patent Application Laid-open No. 2003-85058. Further, since the system has a configuration in that the image forming apparatus requests data acquisition to the print server, the image forming apparatus may desirably be configured to be capable of switching the data acquisition destinations actively.

Further, there is a possibility that the output result may be different depending on the system configuration from that of the original data acquisition destination by switching the data acquisition routes. However, the data output that is not intended by a user may desirably be avoided as much as possible.

SUMMARY OF THE INVENTION

The present invention is directed to a printing control method, and a storage medium capable of controlling printing by the image forming apparatus in an appropriate manner.

According to an aspect of the present invention, an image forming apparatus includes a storage unit configured to store information of a first route for acquiring first print information from an information processing apparatus including the first print information, and to store information of a second route for acquiring second print information via an information conversion apparatus which is configured to convert the first print information into the second print information, wherein the second print information is different from the first print information, a selection unit configured to determine whether conversion of the first print information into the second print information is necessary by referring to job information of the first print information and to select the information of the second route in response to determining that the conversion thereof is necessary, a generation unit configured to determine whether a factor disturbing an acquisition of the second print information exists and, in response to determining that the factor exists, to change the information of the second route selected by the selection unit to the information of the first route, and to generate request information for requesting the conversion to the information processing apparatus so that, among pieces of print information which can be output from the information processing apparatus and can be printed by the image forming apparatus, the first print information becomes print information closer to the second print information.

Further features and aspects of the present invention will become apparent from the following detailed description of exemplary embodiments with reference to the attached drawings

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DESCRIPTION OF THE EMBODIMENTS

Various exemplary embodiments, features, and aspects of the invention will be described in detail below with reference to the drawings.

An exemplary embodiment will be described below with reference to the drawings. The embodiments are not limited to the exemplary embodiments, and all configurations described therein are not necessarily indispensable to solve the problems described herein.

Figure 1:
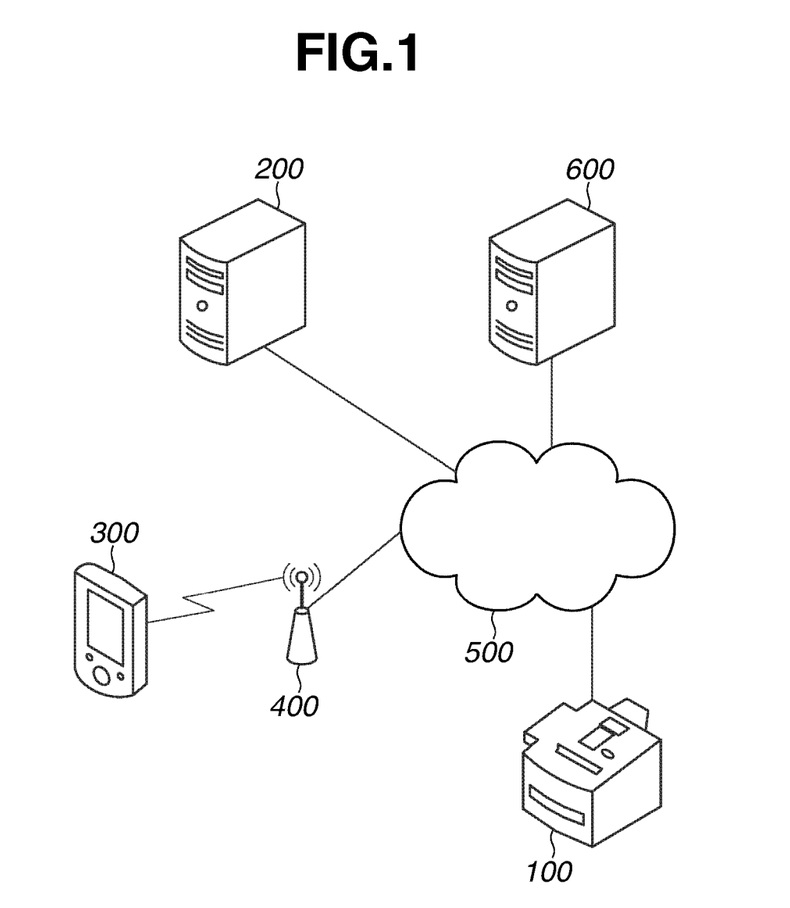
FIG. 1 is a diagram illustrating an example utilization environment of an image forming apparatus.

In the present exemplary embodiment, a technique for acquiring print data (an example of print information) in the image forming apparatus that includes a function for performing the cloud print. FIG. 1 is a diagram illustrating an example usage environment of an image forming apparatus 100 (a print control system) according to the present exemplary embodiment.

The image forming apparatus 100, a print server 200, a wireless network router 400, and a print data conversion server 600 are communicably connected to a cloud network 500. Further, a PDA terminal 300 is communicably connected to the cloud network 500 via the wireless network router 400.

The PDA terminal 300 communicates, in response to a user's instruction, with the print server 200 using a predetermined protocol to transmit a print request to the print server 200.

At that time, a description is given assuming that print data and print setting information about the print data are transmitted together. However, the configuration is not limited thereto. For example, the print data can be stored in the print server 200 in a different manner.

The print server 200 is an example information processing apparatus (computer), and when receiving a print request from the PDA terminal 300, the print server 200 notifies the image forming apparatus 100 that a job relating to printing exists (job notification).

The image forming apparatus 100 receives print data relating to the job (an example of job information) from the print server 200 or the print data conversion server 600 in a predetermined protocol according to the job notification received from the print server 200, and performs printing.

The print data conversion server 600 is an example of an information conversion apparatus. The print data conversion server 600 acquires print data from the print server 200 in response to the data acquisition request described below from the image forming apparatus 100, and then converts the print data into other print data to transmit it to the image forming apparatus 100. For example, when the print data conversion server 600 acquires PDF print data (PDF data) from the print server 200, the print data conversion server 600 converts the PDF data into print data of dedicated format (e.g., PDL data) for the image forming apparatus to transmit it to the image forming apparatus 100.

Figure 2:
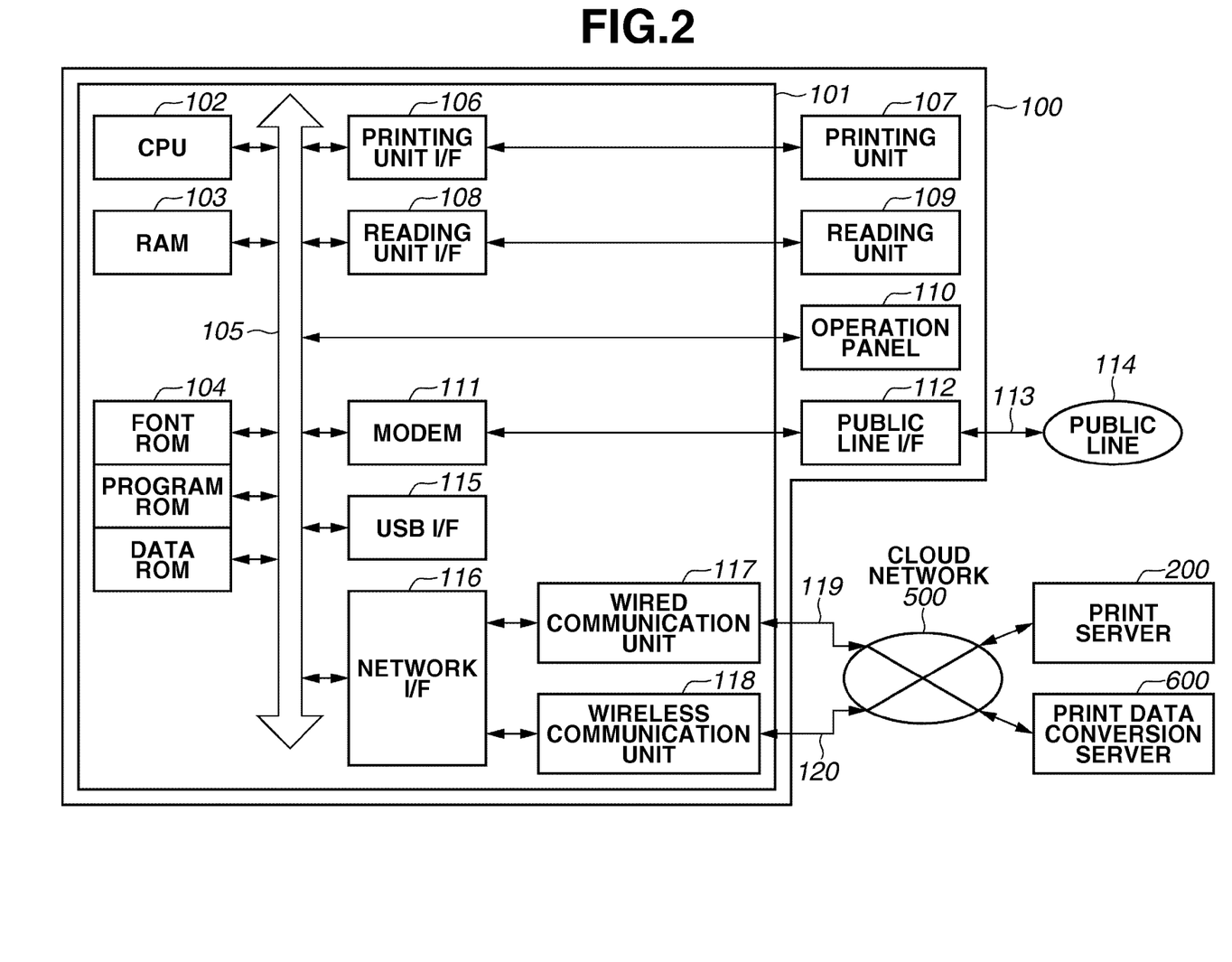
FIG. 2 is a block diagram illustrating an example hardware configuration of the image forming apparatus.

FIG. 2 is a block diagram illustrating an example hardware configuration of the image forming apparatus 100. The image forming apparatus 100 includes a printing unit 107, a reading unit 110, an operation panel 110, a public line interface (I/F) 112, and a controller unit 101 that controls these units.

The controller unit 110 is an example of an information processing apparatus (computer) and includes a central processing unit (CPU) 102, a random access memory (RAM) 103, a read only memory (ROM) 104, a printing unit I/F 106, a reading unit I/F 108, a modulator-demodulator (MODEM) 111, a universal serial bus (USB) I/F 115, and a network I/F 116. Each device is communicably connected to a system bus 105.

The CPU 102 integrally controls each device according to various control programs. The various control programs are read out by the CPU 102 from the storing area (program ROM) in the ROM 104 for storing programs and executed. Alternatively, the various control programs are executed in such a manner that the CPU 102 decompresses and expands the compressed data stored in the program ROM in the ROM 104 into the RAM 103.

Further, the various control programs may be stored in a compressed or non-compressed state in a hard disk drive (HDD) (not illustrated). The ROM 104, the RAM 103, and the HDD are examples of storage units for storing various types of information.

According to the present exemplary embodiment, the CPU 102 executes the processing according to the procedure of the program stored in the ROM 104, and thereby the functions of the image forming apparatus 100 and the processing according to the flowchart (described below) are carried out. Meanwhile, a part of, or whole of, the functions of the image forming apparatus 100 and the processing according to the flowchart (described below) may be performed by dedicated hardware.

The network I/F 116 performs communication processing between the print server 200 and the print data conversion server 600 via the wired communication unit 117 or the wireless communication unit 118 by way of the cloud network 500. The wired communication unit 117 and the cloud network 500 are connected with a communication cable such as a LAN cable 119. The wireless communication unit 118 and the cloud network 500 are connected with an electrical communication 120.

The MODEM 111 is connected to a public line 114 via the public line I/F 112 to perform communication processing with other image forming apparatuses, facsimile apparatuses, and telephones (which are not illustrated). The public line I/F 112 and the public line 114 are connected with a telephone line 113.

The printing unit I/F 106 works as an interface for outputting an image signal to the printing unit 107 (printer engine). Further, the reading unit I/F 108 works as an interface for inputting an image signal from the reading unit 109 (scanner engine). The CPU 102 processes the image signal input from the reading unit I/F 108 to output the processed image signal to the printing unit I/F 106 as an image signal for recording.

Further, the CPU 102 displays characters and symbols on the display unit of the operation panel 110 using font information stored on a storing area (font ROM) in the ROM 104 for storing font information. The CPU 102 also receives instruction information received from a user through the operation panel 110.

In the storing area (data ROM) in the ROM 104 for storing data, the CPU 102 stores apparatus information of the image forming apparatus 100, telephone directory information of users, and division management information, which are read by the CPU 102, when necessary, and updated.

In the present exemplary embodiment, the reading unit 109 and the printing unit 107 are provided in the image forming apparatus 100. However, at least one of the reading unit 109 and the printing unit 107 may be provided outside the image forming apparatus 100.

Figure 3:
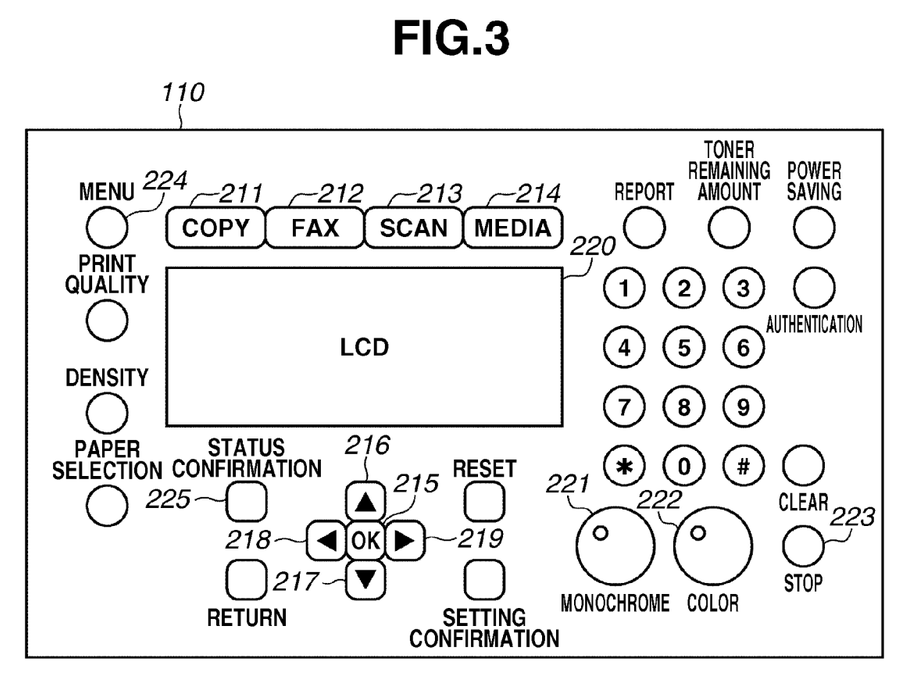
FIG. 3 is a diagram illustrating an example configuration of an operation panel.

FIG. 3 is a diagram illustrating an example configuration of the operation panel 110. A function keys 211 to 214 are function keys of functions respectively corresponding to "COPY", "FAX", "SCAN", "MEDIA PRINT". When one of the function keys is pressed, the screen is shifted to a top screen (basic screen) for a function related to the pressed key.

In addition, the related function key of the selected function is lighted up.

An OK key 215 can receive an item selection instruction. An up arrow key 216, a down arrow key 217, a left arrow key 218, and a right arrow key 219 can receive a movement instruction of an item, respectively. An LCD 220 can display various kinds of screens.

A start key 221 can receive an instruction of monochrome print (e.g., copy). The start key 221 is lighted up in a pressable state. Similarly, the start key 222 can receive an instruction of a color print (e.g., copy). The start key 222 is lighted up in a pressable state. A stop key 223 can receive an instruction for stopping a job.

A menu key 224 is used to shift the screen to a setting screen for receiving setting values relating to the cloud print. Through the setting screen, various kinds of setting values such as an ON/OFF can be designated. A status confirmation key 225 can shift the screen to a history screen indicating a history of the printing.

Figure 4A:
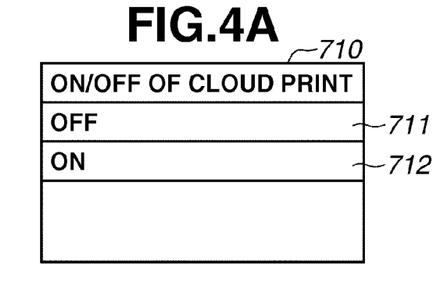
FIGS. 4A to 4H each illustrate an example screen displayed on a liquid crystal display (LCD).

FIGS. 4A to 4H are diagrams each illustrating an example screen displayed on the LCD 220. FIG. 4A illustrates an example screen (setting screen 710) for validating or invalidating the cloud print. The screen is shifted to the menu screen by pressing the menu key 224 on the operation panel 110, and the setting screen 710 is displayed by pressing a system management setting item. The system management setting item is an item in the menu screen.

The setting screen 710 includes three lines, and in the first line, a title is displayed. In the second line, an item 711 for setting "OFF" as a setting value is displayed. In the third line, an item 712 for setting "ON" as a setting value is displayed. Each item is selectable using the OK key 215.

Figure 4B:
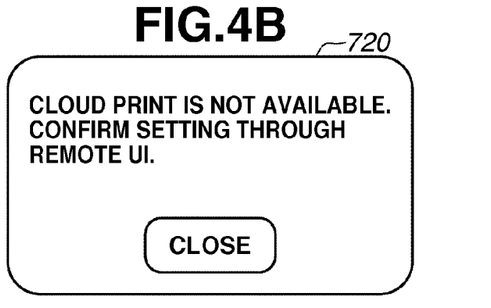

FIG. 4B illustrates an example screen (error screen 720) for notifying an error. The error screen 720 is displayed as a pop-up screen when the cloud print is set valid via the setting screen 710 (the setting value is set to "ON") but the information of the image forming apparatus 100 is not registered in the print server 200 (i.e., the operation environment is not ready).

Figure 4C:
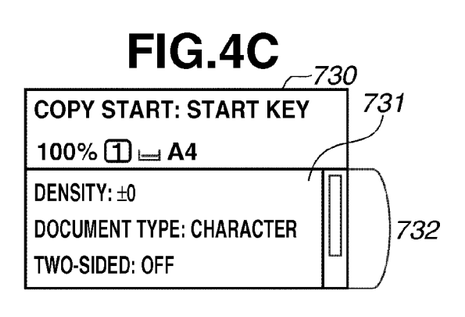

FIG. 4C illustrates an example of a top screen (top screen 730) of the operation panel 110 for a copy function at a normal state (i.e., the cloud print is invalid). The top screen 730 is a basic screen for the copy function and includes five lines. In the first and second lines, a content of an instruction for starting copying, a setting item and setting value of a magnification ratio of enlargement and reduction, a paper tray, and a paper size are displayed.

In the third to fifth lines, setting items relating to the operation mode selectable for a copy job and a setting value 731 are displayed. When the display area is not wide enough to display the above information, a scroll bar 732 is displayed at the right edge of the top screen 730.

Figure 4D:
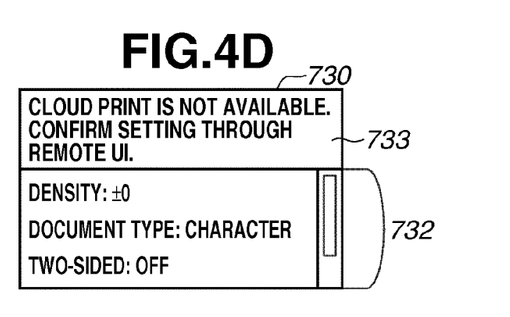

FIG. 4D illustrates an example top screen (top screen 730) for the copy function for displaying an error in a toggle manner when an operation environment is not ready (e.g., the cloud print is set valid (the setting value is set to "ON") but the registration of the information of the image forming apparatus 100 is cancelled).

The error display is cancelled when the cloud print is invalidated (i.e., the setting value is set to "OFF") or the necessary setting value is set after confirming the registration state of the information of the image forming apparatus 100 through the remote user interface (RUI).

Figure 4E:
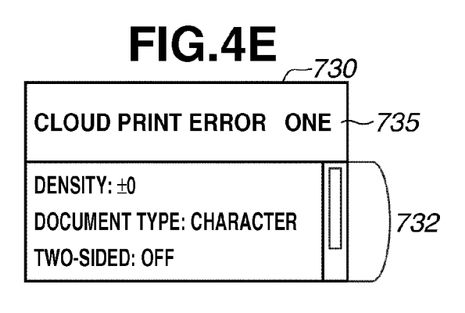
Figure 4F:
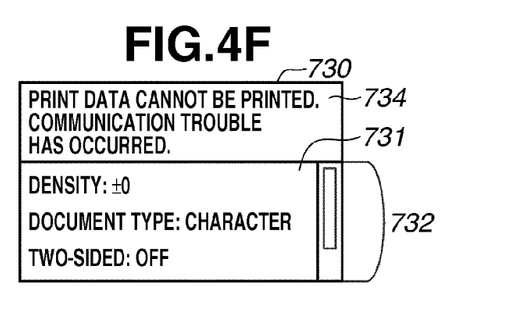

FIGS. 4E and 4F each illustrate an example top screen (top screen 730) for the copy function while a print error is being notified when the cloud print is valid. The image forming apparatus 100 displays the screen when, for example, the proxy data acquisition destination of the data acquisition destination server cannot be found.

On the top screen 730, area 734 or area 735 is displayed in the first and the second lines (status lines), in a toggle manner.

Figure 4G:
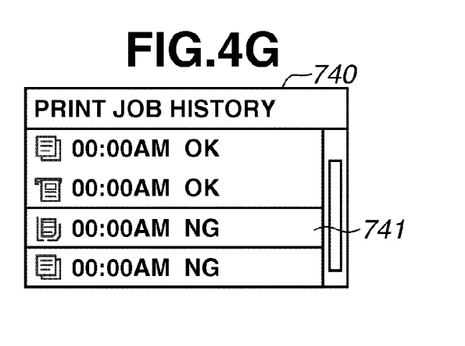

FIG. 4G illustrates an example screen (history screen 740) shifted when the status confirmation key 225 on the operation panel 110 is pressed. In the first line, a title is displayed. In the second to fifth lines, information of items such as a date and a result as a job history is displayed.

Figure 4H:
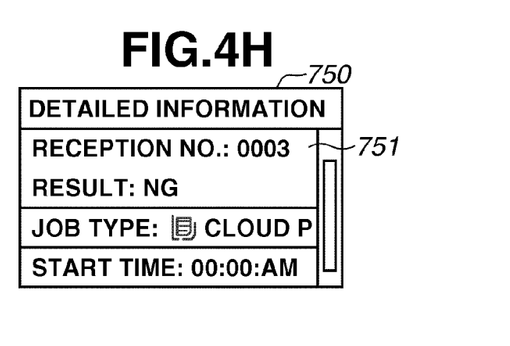

FIG. 4H illustrates an example of a detailed screen (detailed screen 750) of the history displayed by pressing the OK key 215 on the job 714 on which a cursor is positioned in the history screen 740 in FIG. 4G. In the first line, a title is displayed. In the second to fifth lines, information of items such as a reception number, a result, a job type, and a start time is displayed.

Figure 5:
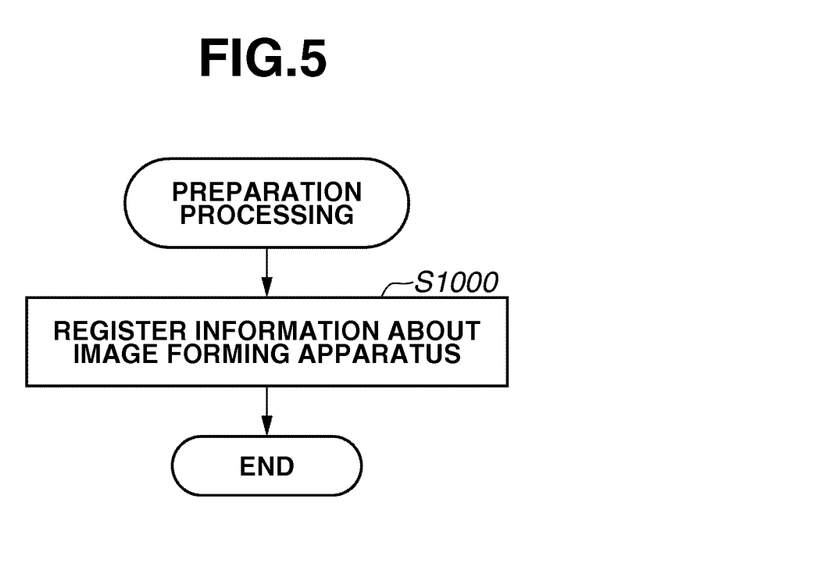
FIG. 5 is a flowchart illustrating an example of preparation processing.

FIG. 5 is an example flowchart illustrating processing (preparation processing) for registering in advance the information of the image forming apparatus 100 by the print server 200. The program and data necessary for the execution of the program relating to the present flowchart are stored in a storage unit such as a HDD, and are read out therefrom to be executed by a CPU.

In order to use the cloud print, it is necessary to register information about the image forming apparatus 100 (information relating to the capability of the image forming apparatus 100) in advance, to the print server 200. The information about the image forming apparatus 100 can be registered using the RUI.

More specifically, through the RUI, information for registration is acquired from the print server 200 and information relating to the image forming apparatus 100 is input according to the content displayed on the browser based on the information for registration. Then, in step S1000, the print server 200 receives the input information from the RUI and stores (registers) it in a storage unit such as a HDD.

Figure 6:
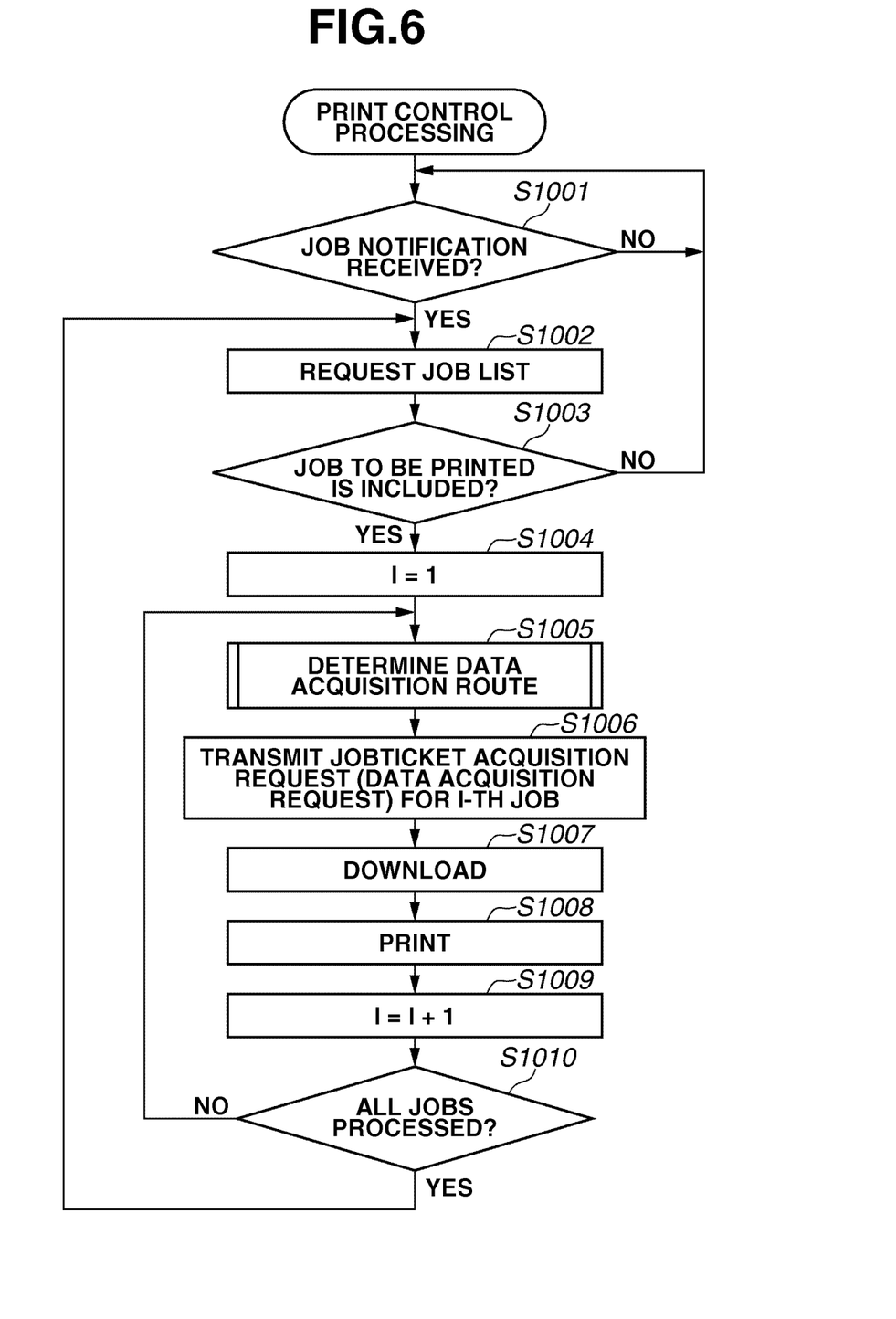
FIG. 6 is a flowchart illustrating an example of printing control processing.

FIG. 6 is a flowchart illustrating an example of basic processing (print control processing) of the cloud print performed by the image forming apparatus 100. The program and data necessary for the execution of the program relating to the present flowchart are stored in the ROM 104, and are read out therefrom into the RAM 103 to be executed by the CPU 102.

Herein, when the registration of the information about the image forming apparatus 100 is completed and the cloud print is set valid (setting value is set to "ON"), the print server 200 and the image forming apparatus 100 are connected constantly using the Extensible Messaging and Presence Protocol (XMPP) protocol. As a result, the image forming apparatus 100 is ready to accept a job notification from the print server 200.

First, in step S1001, the image forming apparatus 100 determines whether a job notification is received. If the image forming apparatus 100 determines that the job notification is received (YES in step S1001), the processing proceeds to step S1002. On the other hand, if the image forming apparatus 100 determines that the job notification is not received (NO in step S1001), the determination in step S1001 is performed again.

In step S1002, the image forming apparatus 100 requests a job list to the print server 200 (fetch request). In step S1003, when receiving the job list from the print server 200, the image forming apparatus 100 determines whether a job to be printed by the image forming apparatus 100 exists.

If the image forming apparatus 100 determines that the job to be printed exists (YES in step S1003), the processing proceeds to step S1004. On the other hand, if the image forming apparatus 100 determines that the job to be printed does not exist (NO in step S1003), the processing proceeds to step S1001.

In step S1004, the image forming apparatus 100 sets "1" to a counter i. In step S1005, the image forming apparatus 100 determines a data acquisition route for the selected job (data acquisition route determination processing).

In the present exemplary embodiment, the image forming apparatus 100 determines whether the data acquisition route is a direct route for acquiring print data from the print server 200 or an indirect route for acquiring print data via the print data conversion server 600. Details of the data acquisition route determination processing are described below with reference to FIG. 10.

In step S1006, the image forming apparatus 100 transmits an acquisition request of a JOBTicket (JOBTicket acquisition request) to a server located on the data acquisition route. In the present exemplary embodiment, the server located on the data acquisition route corresponds to the print server 200 and the print data conversion server 600. In addition, the JOBTicket acquisition request is an example of request information and is, what is called, an acquisition request for print data (data acquisition request).

In step S1007, the image forming apparatus 100 starts downloading of print data of a target job directly from the print server 200 or via the print data conversion server 600. In step S1008, the image forming apparatus 100 prints the downloaded print data. In step S1009, the image forming apparatus 100 counts up the counter i (count the number of printed jobs).

In step S1010, the image forming apparatus 100 determines whether the processing of all jobs to be printed is completed. If the image forming apparatus 100 determines that the processing of all jobs to be printed is completed (YES in step S1010), the processing proceeds to step S1002. On the other hand, if the image forming apparatus 100 determines that the processing of all jobs to be printed is not completed (NO in step S1010), the processing proceeds to step S1005.

Figure 7:
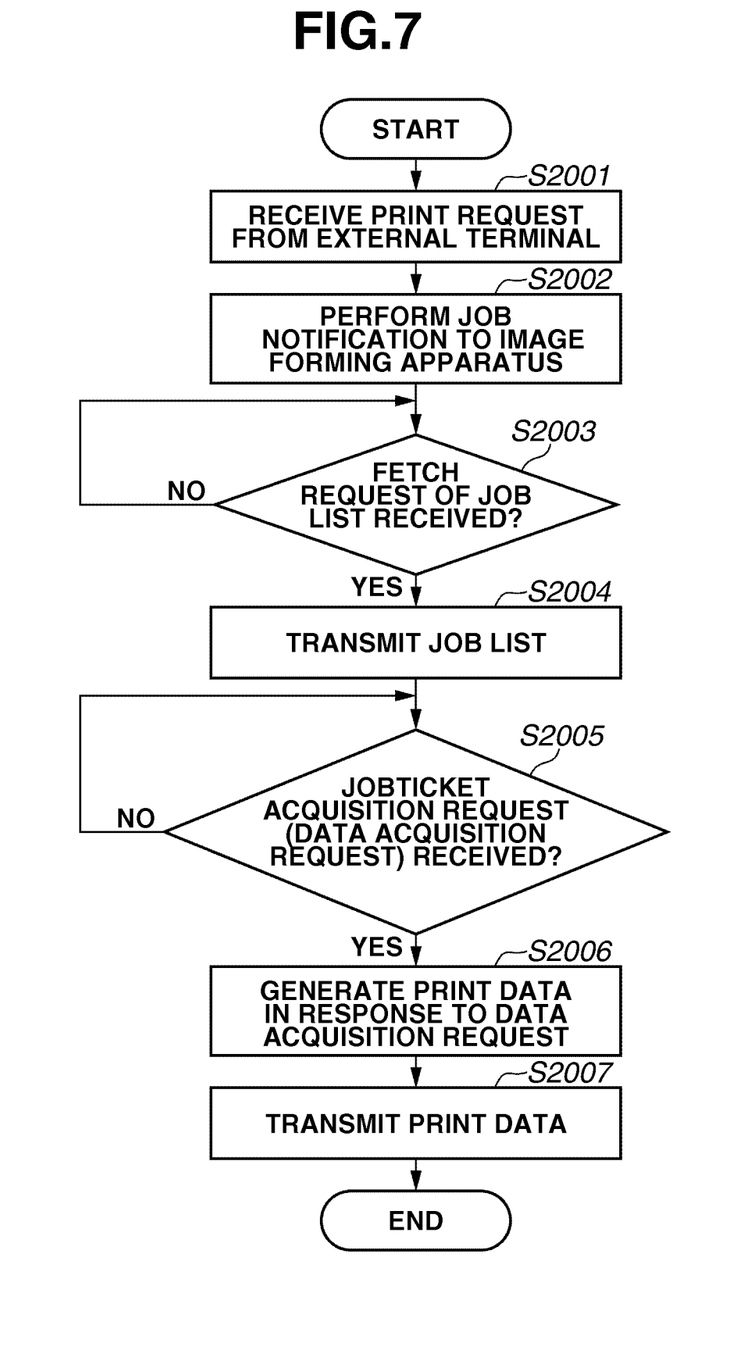
FIG. 7 is a flowchart illustrating an example of server processing.

FIG. 7 is a flowchart illustrating an example of basic processing (server processing) performed by the print server 200. The program and data necessary for the execution of the program relating to the present flowchart are stored in a storage unit such as a HDD, and are read out therefrom to be executed by a CPU.

When the print server 200 and the image forming apparatus 100 are constantly connected with each other using the XMPP protocol, the print server 200 receives, from an external terminal such as the PDA terminal 300, a print request for print data. The present exemplary embodiment is described assuming that the print server 200 receives print data and print setting information together with the print request.

In step S2002, the print server 200 generates a job of the received print data to perform job notification notifying to the image forming apparatus 100 whether the job is present. In step S2003, the print server 200 determines whether the print server 200 has received from the image forming apparatus 100 a fetch request of a job list.

If the print server 200 determines that the fetch request is received (YES in step S2003), the processing proceeds to step S2004. On the other hand, if the print server 200 determines that the fetch request is not received (NO in step S2003), the determination in step S2003 is performed again.

In step S2004, the print server 200 transmits a job list of jobs (a list of jobs) accumulated in a print queue, to the image forming apparatus 100. In step S2005, the print server 200 determines whether a JOBTicket acquisition request (i.e., data acquisition request) is received from the image forming apparatus 100.

If the print server 200 determines that the JOBTicket acquisition request is received (YES in step S2005), the processing proceeds to step S2006. On the other hand, if the print server 200 determines that the JOBTicket acquisition request is not received (NO in step S2005), the determination in step S2005 is performed again.

In step S2006, the print server 200 generates print data of the target job in raster format (raster data), in response to the received data acquisition request. In step S2007, the print server 200 transmits the generated print data to the image forming apparatus 100.

In addition, though it is not illustrated in FIG. 7, when the print server 200 receives a data acquisition request via the print data conversion server 600, the print data of the target job (PDF data) is transmitted to the print conversion server 600. In addition, when the print data conversion server 600 receives PDF data, the print data conversion server 600 converts the PDF data into PDL data to transmit it to the image forming apparatus 100.

Figure 8:
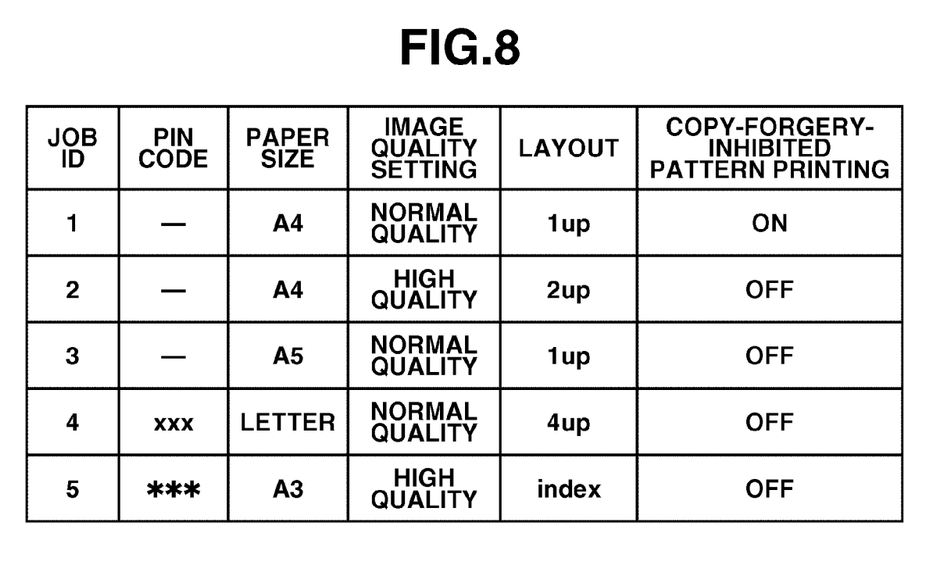
FIG. 8 is a table illustrating an example job list.

FIG. 8 illustrates an example job list which is received by the image forming apparatus 100 from the print server 200. Examples of job list items include a job identification (ID), a personal identification number (PIN) code, a paper size, an image quality setting, a layout, and copy-forgery-inhibited pattern printing. The image forming apparatus 100 can acquire the job list by a fetch request of the job list to the print server 200.

Figure 9A:
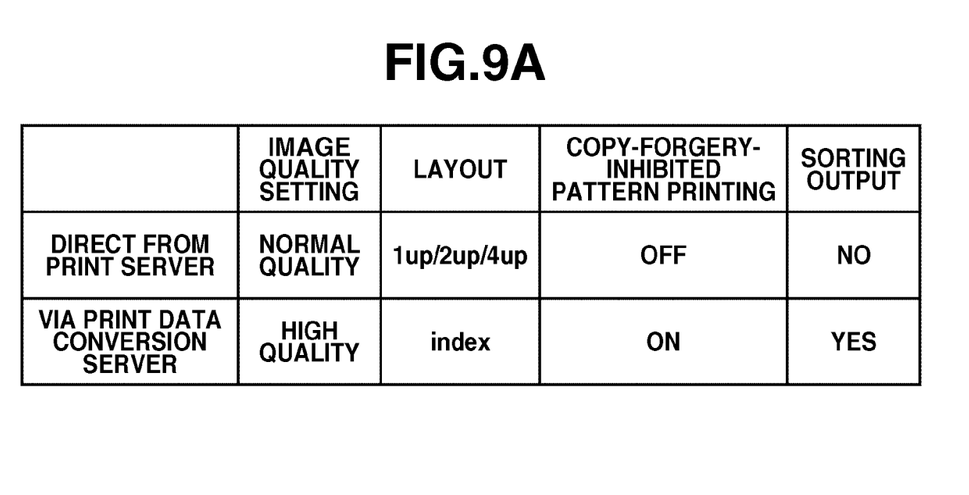
FIGS. 9A and 9B illustrate examples of tables.

FIG. 9A illustrates an example management table to be referred to at a time of determination of a data acquisition route of print data by the image forming apparatus 100. The management table is held within the image forming apparatus 100 (e.g., stored in ROM 104), a data acquisition route is determined based on each parameter (setting information of each setting item to be used for printing). In other words, information in which setting values for predetermined setting items and information of data acquisition routes are associated (an example of management information) is stored in the management table.

Figure 9B:
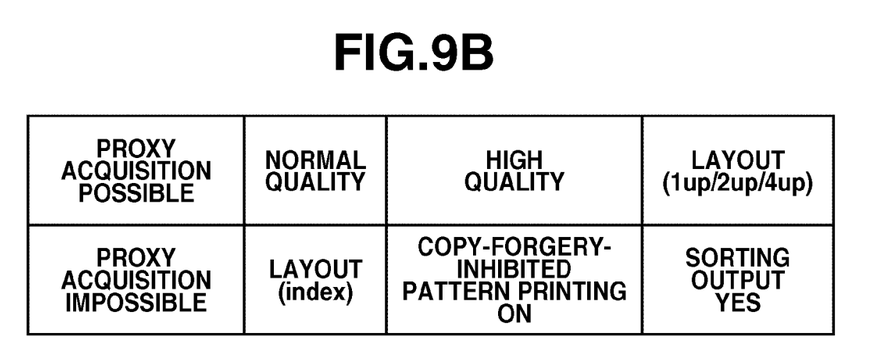

FIG. 9B illustrates an example proxy data availability determination table. In the proxy data availability determination table, information indicating whether a proxy data acquisition route can be secured for each parameter. If each parameter has a setting value for the setting item indicating that proxy data can be acquired, the image forming apparatus 100 can acquire print data by switching the data acquisition routes. The details thereof are described with reference to FIG. 11.

Figure 10:
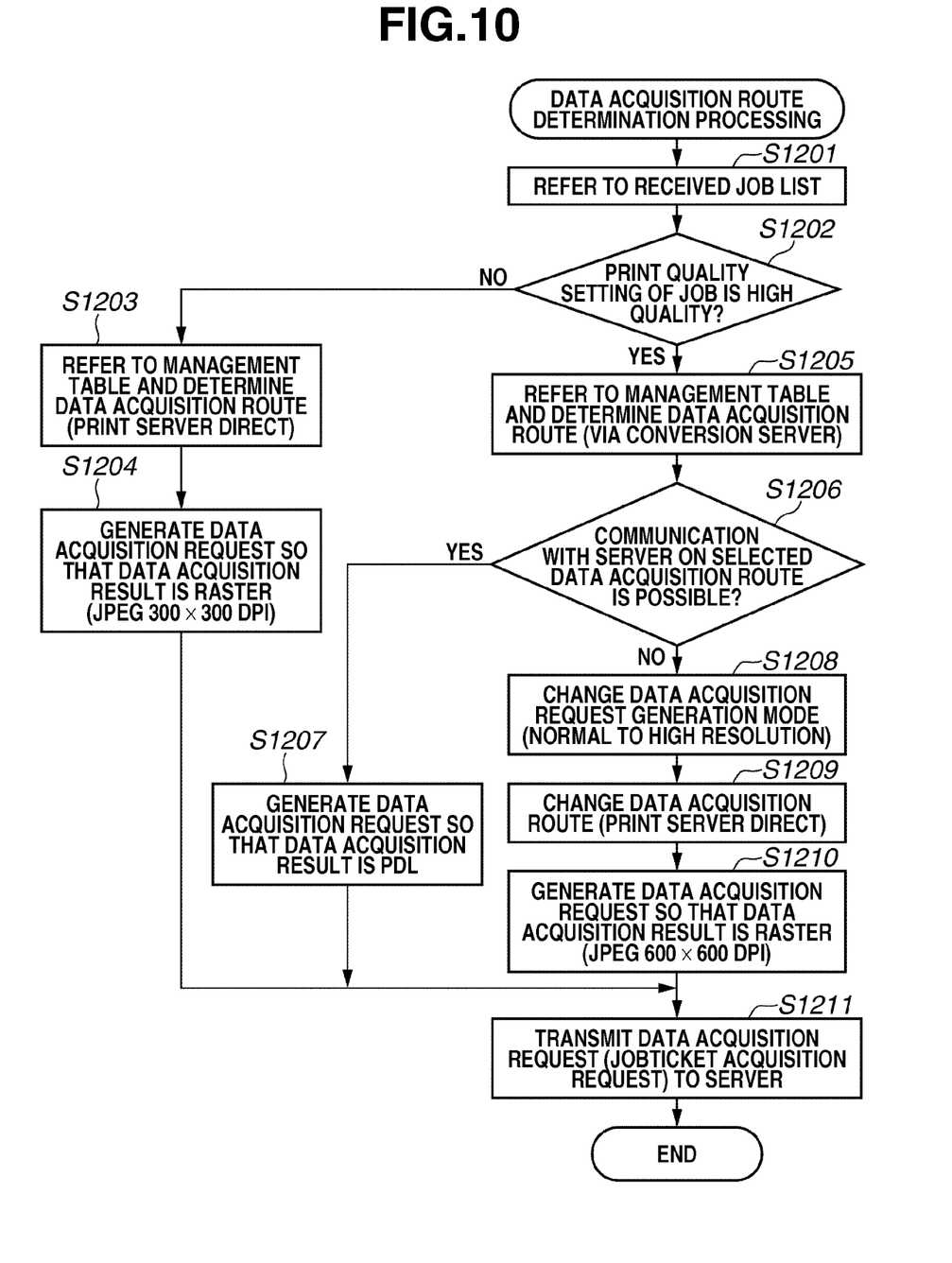
FIG. 10 is a flowchart illustrating an example of data acquisition route determination processing.

FIG. 10 is a flowchart illustrating an example data acquisition route determination processing (processing performed in step S1005 in FIG. 6) for determining a data acquisition route using a job list acquired by the image forming apparatus 100. The program and data necessary for the execution of the program relating to the present flowchart are stored in the ROM 104, and are read out therefrom to be executed by the CPU 102.

In the present exemplary embodiment, the image forming apparatus 100 can both perform printing by directly acquiring print data from the print server 200 and by acquiring print data via the print data conversion server 600. Accordingly, the present exemplary embodiment will be described by using an example in which the image forming apparatus 100 determines a data acquisition route based on an image quality setting value of print setting information of each job after acquiring a job list.

In the present exemplary embodiment, the print server 200 is capable of outputting raster data of a plurality of resolution types (e.g., normal resolution and high resolution) and PDF data, and employs a structure in which the output format is changed according to the image quality setting values specified by the PDA terminal 300.

For example, when the image quality setting value is relatively low, the direct route in which print data is directly acquired from the print server 200 by the image forming apparatus 100, is selected. In this case, as for the format of the print data to be acquired from the print server 200, it is defined in the program and the management table that the image forming apparatus 100 requests a normal resolution raster format (300×300 dpi) (normal image quality generation mode).

On the other hand, for example, when the image quality setting value is relatively high, as a general rule, an indirect route in which print data is acquired by the image forming apparatus 100 via the print data conversion server 600, is selected.

In this case, as for the format of the print data to be acquired via the print data conversion server 600, it is defined in the program and the management table that the image forming apparatus 100 requests a PDL format for low-end devices.

The default resolution of the raster format is fixed to the normal resolution so that, when a relatively low image quality setting value is specified for the image setting value, performance and image quality, on which a little importance is placed, of the low-performance and low-end image forming apparatus can be taken into consideration.

On the other hand, the PDL format print data is acquired via the print data conversion server 600 so that, when a relatively high image quality setting value is specified, print data higher in quality than the print data of the raster format can be acquired.

For example, when the image processing including registration information of the image forming apparatus and look-up-table (LUT) information is performed by the print data conversion server 600, print data higher in quality than print data of the raster format can be acquired. The registration information of the image forming apparatus represents displacement of printing information for each color (cyan, magenta, yellow, and key (black) (CMYK)) due to characteristics of each engine, and the LUT represents an LUT for color conversion.

In step S1201, the image forming apparatus 100 refers to the job list received from the print server 200, in the data acquisition route determination processing. In step S1202, the image forming apparatus 100 analyzes a job in the job list in FIG. 8 to determine whether the image quality setting value included in the job indicates high quality (high quality setting value).

If the image forming apparatus 100 determines that the image quality setting value is the high image quality setting value (YES in step S1202), the processing proceeds to step S1205. On the other hand, if the image forming apparatus 100 determines that the image quality setting value is not the high quality image setting value (NO in step S1202), for example, the image quality setting value indicates the normal image quality, then the processing proceeds to step S1203.

In step S1203, the image forming apparatus 100 determines the direct route for acquiring print data directly from the print server as the data acquisition route. In step S1204, the image forming apparatus 100 generates a data acquisition request so that print data to be acquired is raster data (300× 300 dpi), and then, the processing proceeds to step S1201 (S1006). For example, the image forming apparatus 100 generates a data acquisition request including information indicating to request the raster data of the normal resolution.

In step S1205, the image forming apparatus 100 determines the indirect route for acquiring print data via the print data conversion server 600 as the data acquisition route. In step S1206, the image forming apparatus 100 confirms the connection with the print data conversion server 600 (i.e., determines whether communication is possible with the print data conversion server).

If the image forming apparatus 100 determines that communication is possible (YES in step S1206), the processing proceeds to step S1207. On the other hand, if the image forming apparatus 100 determines that communication is impossible (NO in step S1206), the processing proceeds to step S1208.

In step S1207, the image forming apparatus 100 generates a data acquisition request so that the print data to be acquired is PDL data (BDL-image). For example, the image forming apparatus 100 generates a data acquisition request including information indicating to request PDL data.

In step S1208, the image forming apparatus 100 changes the data acquisition request generation mode from the normal image quality generation mode to the high image quality generation mode. Then, in step S1209, the image forming apparatus 100 switches the data acquisition route to the direct route.

In step S1210, the image forming apparatus 100 generates a data acquisition request so that print data to be acquired is temporarily raster data (600×600 dpi), and then, the processing proceeds to step S1211. For example, the image forming apparatus 100 generates a data acquisition request including information indicating to request the raster data of high resolution.

A data acquisition request for requesting conversion to the print server 200 so that print data (raster data of higher resolution) can be obtained which is closer to the PDL data among the print data (a plurality of raster data) possible to be output by the print server 200 and to be printed by the image forming apparatus 100.

In step S1211, the image forming apparatus 100 transmits a data acquisition request to the data acquisition destination server, and then, the processing proceeds to step S1007. In addition, the processing performed in step S1211 is the same as the processing performed in step S1006.

The configuration for determining the switching of the data acquisition destination, in other word, the configuration for determining whether a factor that disturbs the acquisition of the print data via the print data conversion server 600 exists, is not limited to the configuration for confirming the connection with the print data conversion server 600.

For example, in addition to or in place of this configuration, the configuration to confirm the connection of the print server 200 and the print data conversion server 600 may be employed. Further, for example, the switching of the data acquisition destinations may be determined by acquiring information indicating the state where the print data conversion server 600 is down or the processing of the print conversion server 600 is heavy (i.e., a queue is full).

Further, the configuration for determining a data acquisition route is not limited to the configuration for determining the data acquisition route based on the image quality setting value. For example, the data acquisition route may be determined using setting values of other setting items of the print setting information.

In FIG. 10, the description of the processing is limited to a case where a communication trouble has occurred between the print data conversion server 600 and the image forming apparatus 100, because, if a communication trouble occurs between the print server 200 and the image forming apparatus 100, the job notification in step S1001 cannot be received, and therefore, the job list cannot be acquired. Further, if the connection with the print server 200 cannot be confirmed, the connection between the print server 200 and the print data conversion server 600 may be doubtful.

With these reasons, in the present exemplary embodiment, a description is made in a limited manner for the case where the communication trouble has occurred between the print data conversion server 600 and the image forming apparatus 100.

As described above, according to the present exemplary embodiment, when a communication trouble has occurred between the print data conversion server 600 and the image forming apparatus 100 and switching to the direct route is possible, printing can be executed without the printing result becoming an error.

Further, considering the high image quality setting value set by the user, the acquisition of print data including raster data with a resolution being temporarily enhanced is requested. As a result, the image forming apparatus 100 can perform printing using higher quality print data than that of the output result of the normal direct route, which has an image quality closer to that intended by the user.

Further, according to the present exemplary embodiment, since it is not necessary to input the job again by changing the print setting information, load on the user can be reduced.

In the first exemplary embodiment, as a configuration for determining a data acquisition route, an example referring to the image quality setting value of the print setting information is described. When a communication trouble has occurred, processing can be continued without the printing result becoming an error. However, when an output result differs depending on the data acquisition route, a job which needs to stop printing without switching the data acquisition destinations may be input.

For example, in a printing for creating a security document with a copy-forgery-inhibited pattern watermark (copy-forgery-inhibited pattern printing), if only the print data conversion server 600 is provided with a function of copy-forgery-inhibited pattern printing, it is impossible to perform printing by switching the data acquisition route to the direct route. If the data acquisition route is forcibly switched to change the data request content to the copy-forgery-inhibited pattern printing, the printing may be performed with the copy-forgery-inhibited pattern printing being ignored, depending on the specification.

Therefore, in a second exemplary embodiment, a configuration for suspending jobs of which an acquisition of proxy data is impossible, will be described. In addition, in the present exemplary embodiment, configurations similar to those described in the first exemplary embodiment are denoted by the same reference numerals and sometimes not described below.

Figure 11:
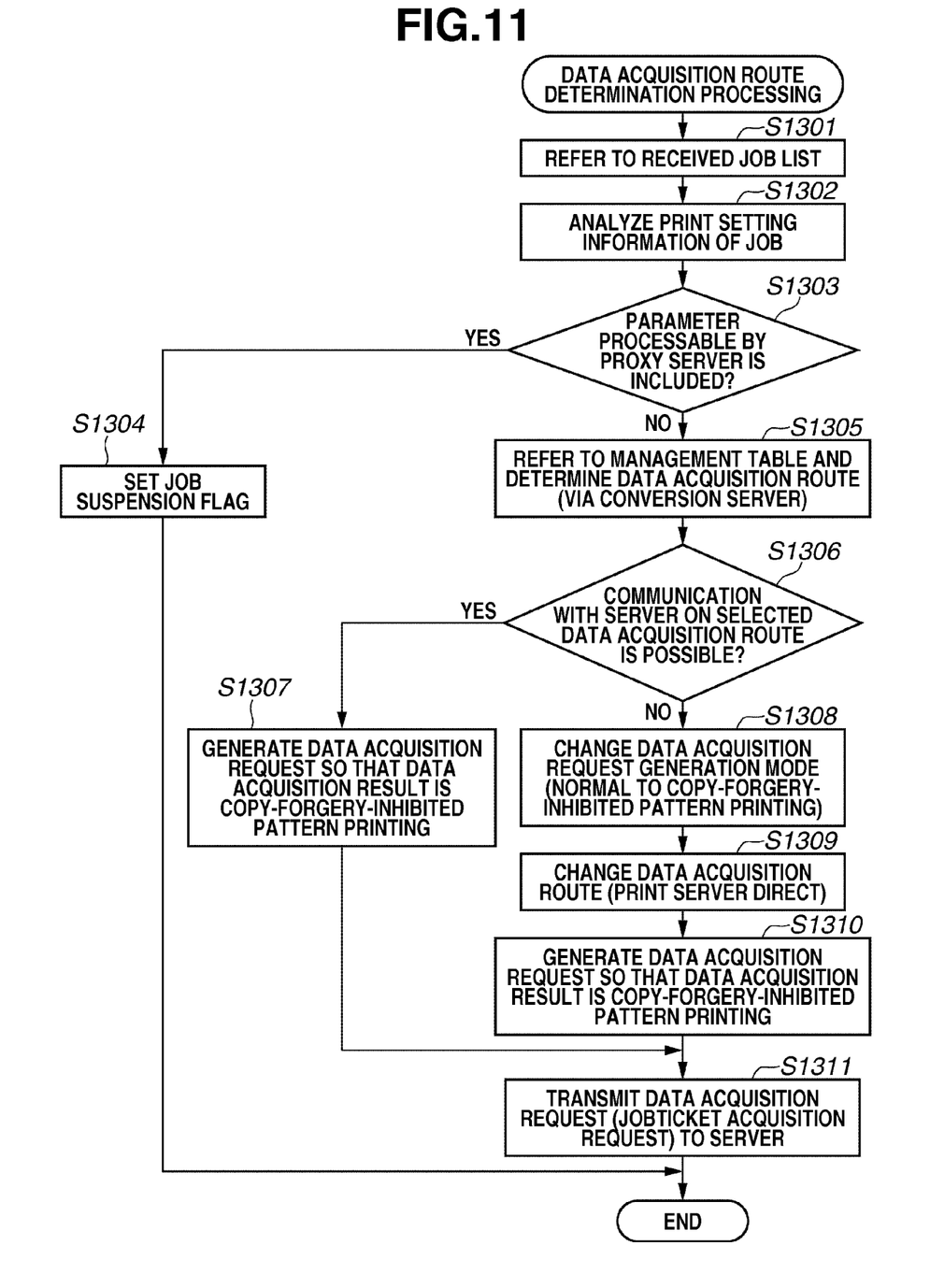
FIG. 11 is a flowchart illustrating an example of data acquisition route determination processing.

FIG. 11 is a flowchart illustrating an example of the data acquisition route determination processing (the processing performed in step S1005). The program and data necessary for the execution of the program relating to the present flowchart are stored in the ROM 104, and are read out therefrom into the RAM 103 to be executed by the CPU 102.

In step S1301, the image forming apparatus 100 refers to a job list received from the print server 200. In step S1302, the image forming apparatus 100 reads out the setting value (e.g., information relating to the copy-forgery-inhibited pattern printing) of the print setting information included in the job list in FIG. 8. In step S1303, the image forming apparatus 100 refers to the proxy data availability determination table illustrated in FIG. 9B to determine whether the read out setting value is a parameter capable of acquiring the proxy data.

If the image forming apparatus 100 determines that the parameter incapable of acquiring proxy data is included (YES in step S1303), the processing proceeds to step S1304. On the other hand, if the image forming apparatus 100 determines that it is not included (NO in step S1303), the processing proceeds to step S1305.

In step S1304, the image forming apparatus 100 sets a job suspension flag and performs processing of the next job (processing in step S1009). At this time, the image forming apparatus 100 displays, for example, on the LCD 220 that a job impossible to output exists.

In step S1305, the image forming apparatus 100 determines the data acquisition route. In the present exemplary embodiment, the indirect route is determined as the data acquisition route. In step S1306, the image forming apparatus 100 confirms the connection with the data acquisition route destination server (the print data conversion server 600).

Subsequently, if the connection is confirmed (YES in step S1306), like in the processing performed in step S1206 and subsequent processing in the first exemplary embodiment, the processing proceeds to step S1307. In step S1307, the image forming apparatus 100 generates a data acquisition request so that the print data to be acquired becomes the print data for the copy-forgery-inhibited pattern printing. For example, the image forming apparatus 100 generates a data acquisition request including information indicating to request the print data for the copy-forgery-inhibited pattern printing.

On the other hand, if the connection is not confirmed (NO in step S1306), then the processing proceeds to step S1308. In step S1308, the image forming apparatus 100 changes the data acquisition generation mode from the normal print generation mode to the copy-forgery-inhibited pattern printing generation mode. Then, in step S1309, the image forming apparatus 100 switches the data acquisition route to the direct route. In step S1310, the image forming apparatus 100 generates a data acquisition request so that the print data to be acquired becomes the print data for the copy-forgery-inhibited pattern printing.

In step S1311 (S1006), the image forming apparatus 100 transmits a data acquisition request to the data acquisition destination server. Then, the image forming apparatus 100 performs the processing in step S1007 and the subsequent steps.

As described above, according to the present exemplary embodiment, printing control can be performed in a more appropriate manner by suspending jobs of print data which cannot acquire proxy data.

The present exemplary embodiment is not limited to the above-described configuration. For example, if the image forming apparatus 100 determines that the job is not the job of the print data which cannot acquire proxy data (NO in step S1303), the processing in step S1202 and the subsequent steps in the first exemplary embodiment may be performed, in place of the processing in step 1305 and the subsequent steps.

With this configuration, when an instruction for performing copy-forgery-inhibited pattern printing is given to generate a security document, control for not switching the data acquisition routes automatically can be performed.

Further, for example, after determining "NO" in step S1306, the determination in step S1303 may be performed, and when it is determined that the job is the job of print data which cannot acquire proxy data, the configuration for providing a screen to a user to confirm whether to continue printing, may be employed.

For example, when the user determines to continue printing, the image forming apparatus 100 generates a data acquisition request including information indicating to request print data. Then, the processing proceeds to step S1311. On the other hand, when the user determines not to continue printing, the image forming apparatus 100 set a job suspension flag, and processes the next job.

With this configuration, when a communication trouble occurs, according to the print data (i.e., print setting information), it is possible to select whiter to intentionally stop the printing or forcibly continue the printing. In this configuration, after cancelling the communication error, printing is to be started again.

Further, for example, after determining "NO" in step S1306, the determination in step S1303 may be performed, and when it is determined that the job is the job of print data which cannot acquire proxy data, the image forming apparatus 100 sets the job suspension flat. Then, the screen illustrated in FIGS. 4E and 4F may be displayed on the LCD 220, and the next job may be processed. When the image forming apparatus 100 determines that the job is not the job of print data which cannot acquire proxy data, the processing proceeds to step S1308.

The configurations according to the exemplary embodiments described above can be employed arbitrarily in combination.

An embodiment can be realized by performing the following processing. That is, a program (software) to realize the functions of the above described exemplary embodiments is supplied to a system or an apparatus via a network or various kinds of storage media, and the program is read out by a computer, a CPU, or a microprocessor unit (MPU) of the system or the apparatus to be executed thereby.

According to the configurations of the above described exemplary embodiments, printing can be controlled in a more appropriate manner.

The preferred exemplary embodiments are described in detail above. However, the embodiments are not limited to the specific exemplary embodiments, and embodiments can also be implemented by modifying or altering the embodiments instead of or in addition to the above-described exemplary embodiments.

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium). In such a case, the system or apparatus, and the recording medium where the program is stored, are included as being within the scope of the present invention. In an example, a computer-readable storage medium may store a program that causes an image forming apparatus to perform a method described herein. In another example, a central processing unit (CPU) may be configured to control at least one unit utilized in a method or apparatus described herein.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2011-250878 filed Nov. 16, 2011, which is hereby incorporated by reference herein in its entirety.

What is claimed is:

1. An image forming apparatus comprising:
a storage unit configured to store information of a first route for acquiring first print information from an information processing apparatus including the first print information, and to store information of a second route for acquiring second print information via an information conversion apparatus which is configured to convert the first print information into the second print information, wherein the second print information is different from the first print information;
a selection unit configured to determine whether conversion of the first print information into the second print information is necessary by referring to job information of the first print information and to select the information of the second route in response to determining that the conversion thereof is necessary; and
a generation unit configured to determine, in response to determining that the conversion thereof is necessary, whether a factor disturbing an acquisition of the second print information from the information conversion apparatus exists,
wherein, in response to determining that the factor exists, the generation unit changes the information of the selected second route selected by the selection unit to the information of the first route and generates request information for requesting the conversion of the first print information into another print information, and wherein the generated request information is sent to the information processing apparatus instead of to the information conversion apparatus, and wherein the generated request information is configured to cause the information processing apparatus to convert the first print information into print information that is close to matching the second print information without the information processing apparatus converting the first print information into the actual second print information such that, among pieces of print information which can be output from the information processing apparatus to the image forming apparatus and can be printed by the image forming apparatus, the first print information is print information closer to matching the second print information than the other pieces of print information which can be output from the information processing apparatus to the image forming apparatus.

2. The image forming apparatus according to claim 1, further comprising an acquisition unit configured to acquire the job information from the information processing apparatus.

3. The image forming apparatus accordant to claim 1, wherein, in response to the generation unit confirming that communication is impossible in at least one of a connection between the information processing apparatus and the information conversion apparatus and a connection between the information conversion apparatus and the image forming apparatus, the generation unit determines that the factor disturbing the acquisition of the second print information from the information conversion apparatus exists and changes the information of the selected second route to the information of the first route.

4. The image forming apparatus according to claim 1, wherein the storage unit stores management information in which setting information of a predetermined item and route information are associated to each other, and wherein the selection unit specifies setting information of a setting item included in the job information, specifies whether the specified setting information is associated with the information of the second route using the management information, and determines that conversion of the first print information into the second print information is required.

5. The image forming apparatus according to claim 1, further comprising a transmission unit configured to transmit the request information to the information processing apparatus.

6. The image forming apparatus according to claim 1, further comprising a printing unit configured to receive, from the information processing apparatus, the print information converted according to the request information and to print the converted print information.

7. The image forming apparatus according to claim 1, wherein, in response to determining that the factor disturbing the acquisition of the second print information from the information conversion apparatus does not exist, the generation unit generates request information for requesting the conversion of the first print information into the second print information, and the generated request information is sent to the information conversion apparatus instead of to the information processing apparatus.

8. A print control method for an image forming apparatus having a storage unit configured to store information of a first route for acquiring first print information from an information processing apparatus including the first print information, and to store information of a second route for acquiring second print information via an information conversion apparatus which is configured to convert the first print information into the second print information, wherein the second print information is different from the first print information, the print control method comprising:

determining whether conversion of the first print information into the second print information is necessary by referring to job information of the first print information and selecting the information of the second route in response to determining that the conversion thereof is necessary; and determining, in response to determining that the conversion thereof is necessary, whether a factor disturbing an acquisition of the second print information from the information conversion apparatus exists, wherein, in response to determining that the factor exists, determining whether the factor exists includes changing the information of the selected second route to the information of the first route and generating request information for requesting the conversion of the first print information into another print information, and wherein the generated request information is sent to the information processing apparatus instead of to the information conversion apparatus, and wherein the generated request information is configured to cause the information processing apparatus to convert the first print information into print information that is close to matching the second print information without the information processing apparatus converting the first print information into the actual second print information such that, among pieces of print information which can be output from the information processing apparatus to the image forming apparatus and can be printed by the image forming apparatus, the first print information is print information closer to matching the second print information than the other pieces of print information which can be output from the information processing apparatus to the image forming apparatus.

9. A non-transitory computer-readable storage medium storing a computer-executable program that causes a computer of an image forming apparatus to perform the print control method according to claim 8.

* * * * *